United States Patent
Okuno et al.

(10) Patent No.: US 10,057,552 B2
(45) Date of Patent: Aug. 21, 2018

(54) COOLING DEVICE AND PROJECTION IMAGE DISPLAY DEVICE

(71) Applicant: Panasonic Intellectual Property Management Co., Ltd., Osaka (JP)

(72) Inventors: Manabu Okuno, Osaka (JP); Naoko Yamashita, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/472,889

(22) Filed: Mar. 29, 2017

(65) Prior Publication Data

US 2017/0302895 A1  Oct. 19, 2017

(30) Foreign Application Priority Data

Apr. 18, 2016 (JP) .................. 2016-082556
Feb. 24, 2017 (JP) .................. 2017-033073

(51) Int. Cl.
| | |
|---|---|
| *G03B 21/14* | (2006.01) |
| *H04N 9/31* | (2006.01) |
| *F28D 15/02* | (2006.01) |
| *G02B 26/00* | (2006.01) |
| *G02B 26/08* | (2006.01) |

(52) U.S. Cl.
CPC ....... *H04N 9/3144* (2013.01); *F28D 15/0275* (2013.01); *G02B 26/008* (2013.01); *G02B 26/0833* (2013.01); *H04N 9/3114* (2013.01)

(58) Field of Classification Search
CPC ...... H04N 9/3144; H04N 9/3114; H04N 9/31; F28D 15/0275; G02B 26/008; G02B 26/0833; G02B 26/00; G03B 21/16
See application file for complete search history.

(56) References Cited

U.S. PATENT DOCUMENTS

| | | | | |
|---|---|---|---|---|
| 6,751,027 | B2 * | 6/2004 | Van Den Bossche | G03B 21/16 348/E9.027 |
| 7,487,825 | B2 * | 2/2009 | Yu | B23P 15/26 165/104.21 |
| 7,609,521 | B2 * | 10/2009 | Wu | F28D 15/0275 165/104.33 |
| 7,679,912 | B1 * | 3/2010 | Xiong | F28D 15/0275 165/104.33 |
| 7,694,718 | B2 * | 4/2010 | Lai | H01L 23/427 165/104.21 |
| 7,938,543 | B2 * | 5/2011 | Gerets | G02F 1/133553 353/52 |
| 2005/0012905 | A1 * | 1/2005 | Morinaga | G03B 21/18 353/58 |
| 2007/0157627 | A1 * | 7/2007 | Hsu | F25B 21/02 62/3.2 |

(Continued)

FOREIGN PATENT DOCUMENTS

JP    2000-338603    12/2000

*Primary Examiner* — William C Dowling
(74) *Attorney, Agent, or Firm* — McDermott Will & Emery LLP

(57) ABSTRACT

The cooling device of the present disclosure has a thermally conductive base that is thermally connected to a heat-generating section, a heat pipe section embedded in the base, and a fin section that has a plurality of fins and is connected to the base in a way that the fin section covers the heat pipe section.

5 Claims, 9 Drawing Sheets

(56) References Cited

U.S. PATENT DOCUMENTS

2008/0289799 A1\* 11/2008 Luo ................... F28D 15/0266
  165/80.3
2014/0000851 A1\* 1/2014 Wang ..................... F28D 15/02
  165/104.26

\* cited by examiner (a)          (b)

COOLING DEVICE AND PROJECTION IMAGE DISPLAY DEVICE

BACKGROUND

1. Technical Field

The present disclosure relates to a cooling device for cooling a heat-generating component used in a projection image display device.

2. Description of the Related Art

A projection image display device that employs a digital micromirror device (hereinafter, referred to as a DMD) as a light modulation device has been commercially available. With increase in performance, a projection image display device has to achieve higher resolution and higher brightness. Due to increase in brightness, a DMD is exposed to intense illumination light, and at that time, the DMD is heated by the light absorbed in it. To release heat, a cooling structure is disposed in the DMD.

Patent Literature 1 discloses a cooling device for cooling an image display device. The cooling device has a heatsink, a ventilation duct, and a fan so as to cool the image display device.

CITATION LIST

Patent Literature

PTL 1: Japanese Unexamined Patent Application Publication No. 2000-338603

SUMMARY

The present disclosure provides a highly efficient cooling device for cooling a component heated due to enhanced brightness.

The cooling device of the present disclosure has a thermally conductive base that is thermally connected to a heat-generating section, a heat pipe section embedded in the base, and a fin section that has a plurality of fins and is connected to the base in a way that the fin section covers the heat pipe section.

The cooling device of the present disclosure enhances cooling efficiency and is thus useful for cooling a heat-generating component.

DETAILED DESCRIPTION

Hereinafter, an exemplary embodiment will be described in detail, with reference to the accompanying drawings. However, details beyond necessity (for example, descriptions on well-known matters or on substantially identical structures) may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

Hereinafter, the structure of the first exemplary embodiment will be described with reference to FIG. 1 through FIG. 6.

[1-1. Description of Structure]

[1-1-1. General Structure]

Figure 1:
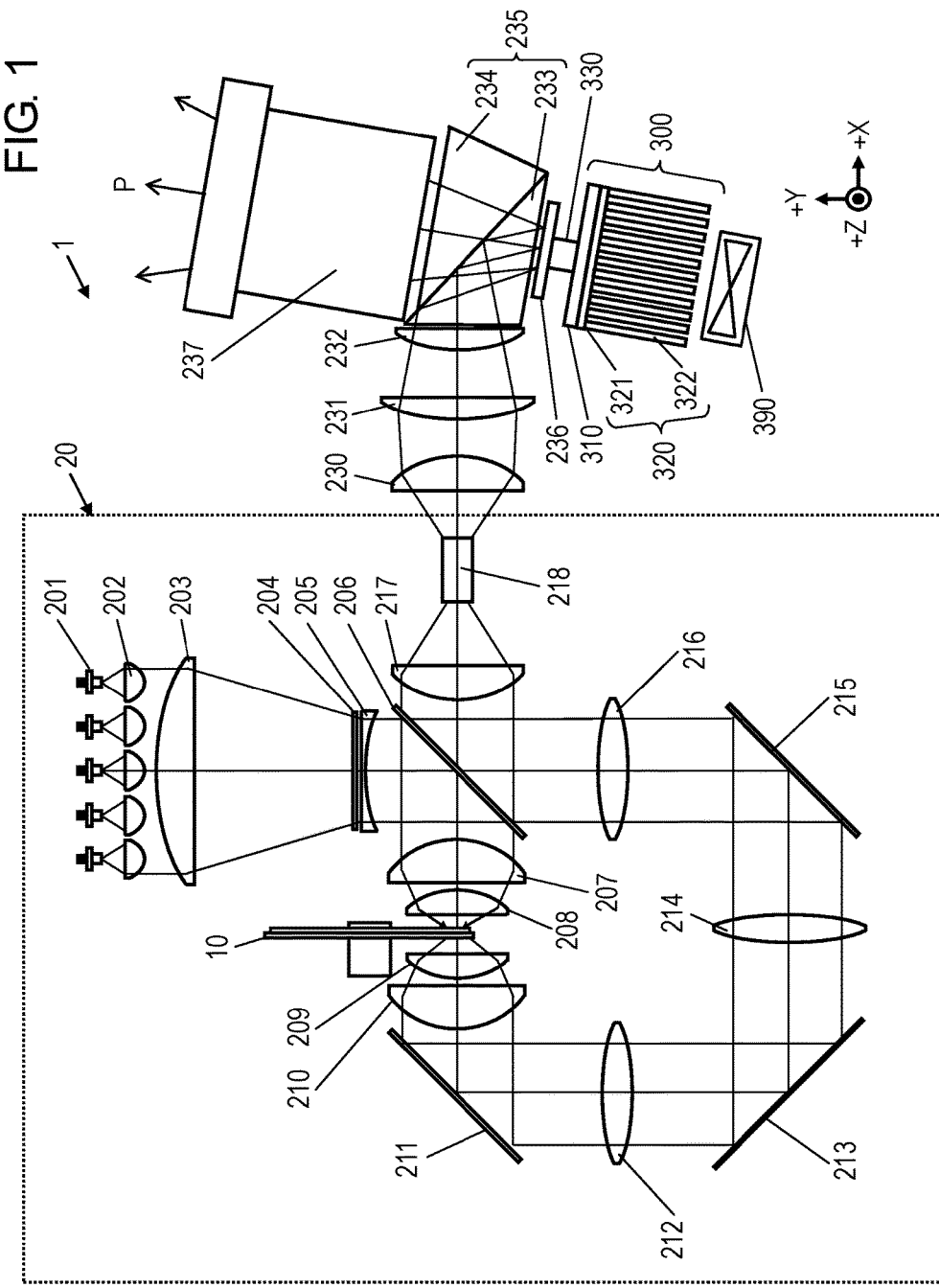
FIG. 1 shows a structure of a projection image display device having the cooling device in accordance with a first exemplary embodiment.

FIG. 1 illustrates the structure of the optical system of projection image display device 1 having the cooling device of the present disclosure. For convenience sake, the description of FIG. 1 through FIG. 6 is based on the X-Y-Z orthogonal coordinate system shown in each drawing.

First, illumination optical system 20 of projection image display device 1 will be described. Laser source 201 as an excitation light source is a blue laser diode. To provide an illumination device with high brightness, laser source 201 is formed of a plurality of laser diodes. FIG. 1 shows an example where five blue laser diodes are disposed in a row; usually, a plurality of blue laser diodes is disposed in a matrix arrangement on a plane. The laser light as an excitation light fed from each laser diode of laser source 201 is collimated by respective collimator lens 202. Collimation by collimator lens 202 allows the output beams to become substantially parallel to each other. The light flux of the parallel beams is collected by lens 203. After passing through diffuser panel 204, the beams become substantially parallel beams again by lens 205. The flux of laser beams of substantially parallel is fed into dichroic mirror 206 disposed at substantially 45° to the optical axis.

Diffuser panel 204 is a glass plate and one of whose surfaces forms a diffusing plane having minute irregularities. Dichroic mirror 206 reflects light in the wavelength band of the blue laser diode; on the other hand, it passes light that doesn't belong to the aforementioned wavelength band.

When a laser light is fed into dichroic mirror 206 in the −Y direction shown in FIG. 1, it reflects off dichroic mirror 206 and goes in the −X direction of FIG. 1. After collected by lens 207 and lens 208, the laser light excites the phosphor formed on phosphor wheel 10.

Figure 2:
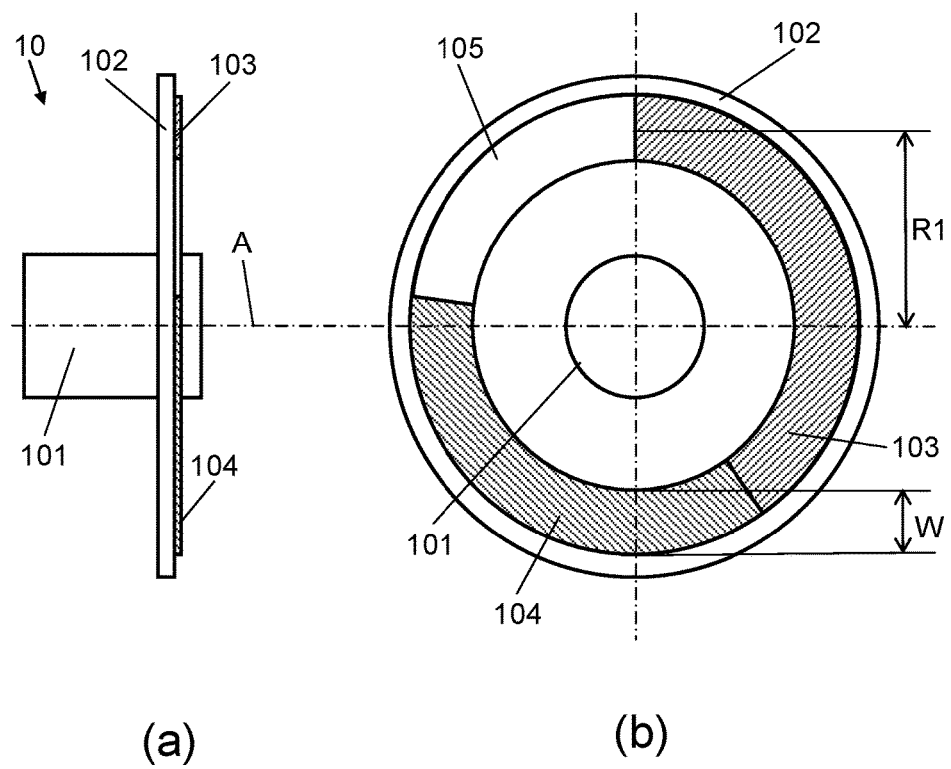
FIG. 2 shows a phosphor wheel employed for the projection image display device in accordance with the first exemplary embodiment.

As shown in side view (a) of FIG. 2, phosphor wheel 10 is formed of motor 101 and rotary disk 102 that is rotationally driven on the rotation axis of motor 101.

Rotary disk 102, as shown in elevation view (b) of FIG. 2, has red phosphor section 103, green phosphor section 104, and opening 105. They are formed in a circular area having predetermined width W that extends inward and outward from the circle, by distance R1, away from center A of the rotation axis of the phosphor wheel.

When the laser light fed from laser light source 201 is collected into red phosphor section 103 of phosphor wheel 10, red phosphor section 103 is excited thereby and emits red light. Similarly, when the laser light fed from laser light source 201 is collected into green phosphor section 104 of phosphor wheel 10, green phosphor section 104 is excited thereby and emits green light. When the laser light fed from laser light source 201 is collected into opening 105, the light passes through phosphor wheel 10.

The red light and the green light obtained by phosphor wheel 10, as shown in FIG. 1, goes in the +X direction out of phosphor wheel 10. The phosphor light, which is emitted in the −X direction from red phosphor section 103 and green phosphor section 104, reflects off rotary disk 102 and goes in the +X direction. These lights of red and green are collimated by lens 208 and lens 207, pass through dichroic mirror 206, then collected by collecting lens 217 and go into rod integrator 218.

Of the blue light fed from the blue laser diode, the light that has passed through opening 105 travels through lens 209, lens 210, mirror 211, lens 212, mirror 213, lens 214, mirror 215, lens 216, and then reflects off dichroic mirror 206. After that, the light is collected by collecting lens 217 and then fed into rod integrator 218. Each of Lenses 212, 214, and 216 works as a relay lens.

The light fed from rod integrator 218 enters, via lens 230, lens 231, and lens 232, into TIR (Total Internal Reflection) prism 235, which has a pair of prisms of first prism 233 and second prism 234. After entering TIR prism 235, the light undergoes optical modulation by image signals in DMD (Digital Micromirror Device) 236 as a light modulation device, and the optically modulated light goes out as video light P. Each of lens 230 and lens 231 works as a relay lens. Lens 232 allows the light on the output side of rod integrator 216 to be formed an image on DMD 236.

The light from DMD 236 enters into projection lens 237 and then it is projected as video light P on a screen as enlarged image. Projection lens 237 is an example of the projection optical system.

When DMD 236 receives light, a part of the light changes into heat and it increases the temperature of DMD 236. DMD 236 is an example of the heat-generating component of the projection image display device. To cool DMD 236, the structure has heatsink 300 that is thermally connected to DMD 236 via connecting member 330. Heatsink 300 is an example of the cooling device and detailed description thereof will be given later. Heatsink 300 has base 310 in which a plurality of heat pipes in an integral arrangement is embedded, and fin section 320 having base plate 321 and a plurality of fins 322 disposed on base plate 321. The structure of the exemplary embodiment further has cooling fan 390. The heat generated in DMD 236 is thermally transferred to heatsink 300; meanwhile fan 390 makes the air move to heatsink 300 for dissipating heat therefrom. Base 310 and fin section 320 that form heatsink 300 are made of aluminum. Connecting member 330, which is integrally disposed to base 310, is also made of aluminum.

[1-1-2. Structure of Heatsink]

Figure 3:
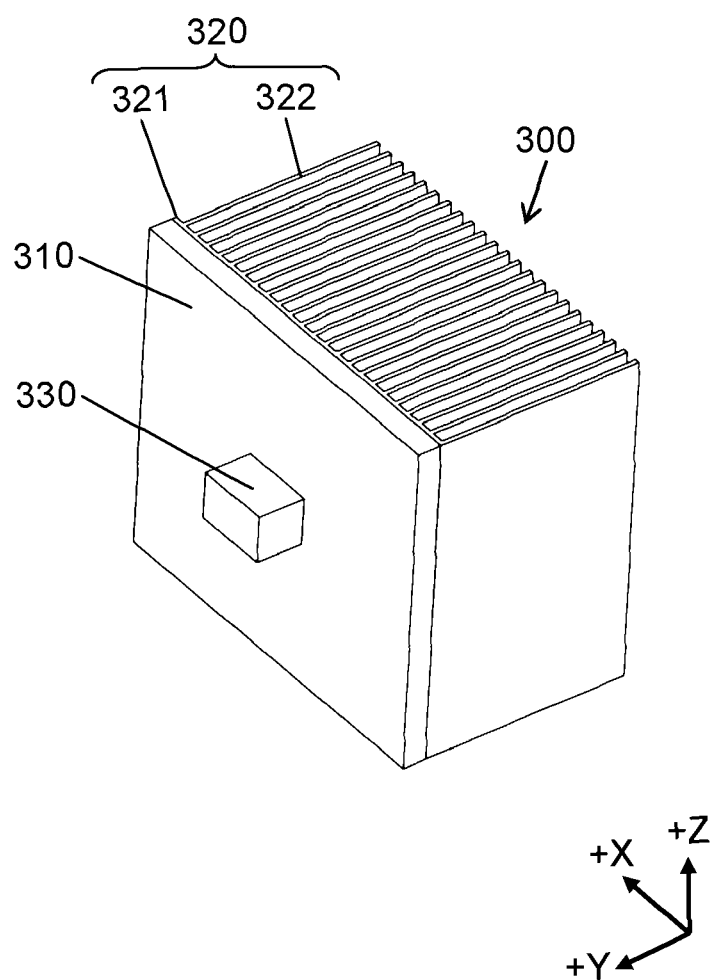
FIG. 3 is an external perspective view of a heatsink in accordance with the first exemplary embodiment.
Figure 4:
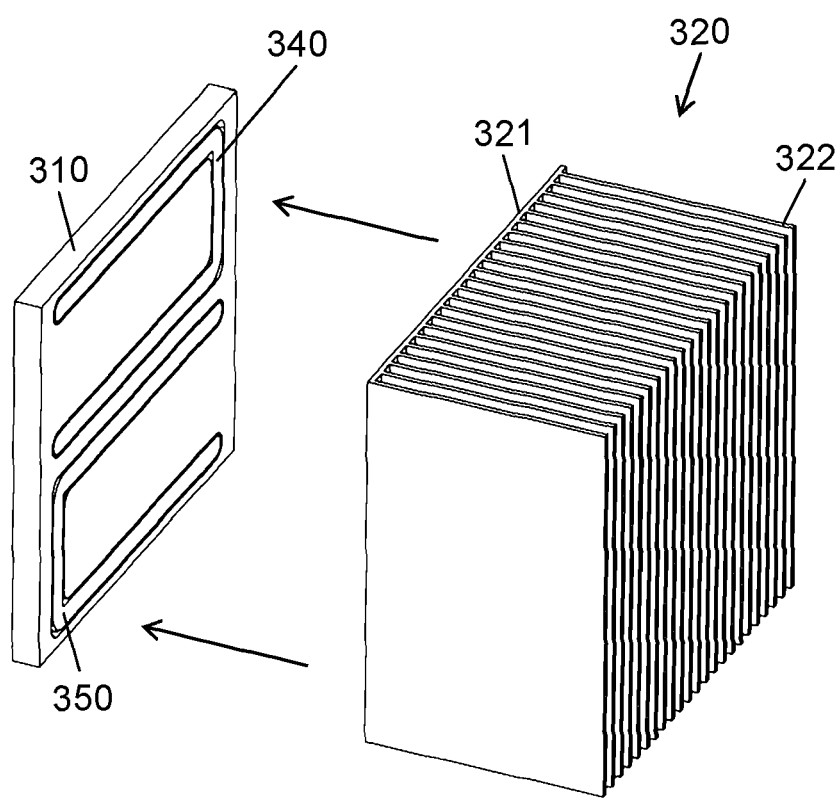
FIG. 4 is a perspective view showing a disassembled state of the heatsink in accordance with the first exemplary embodiment.
Figure 5:
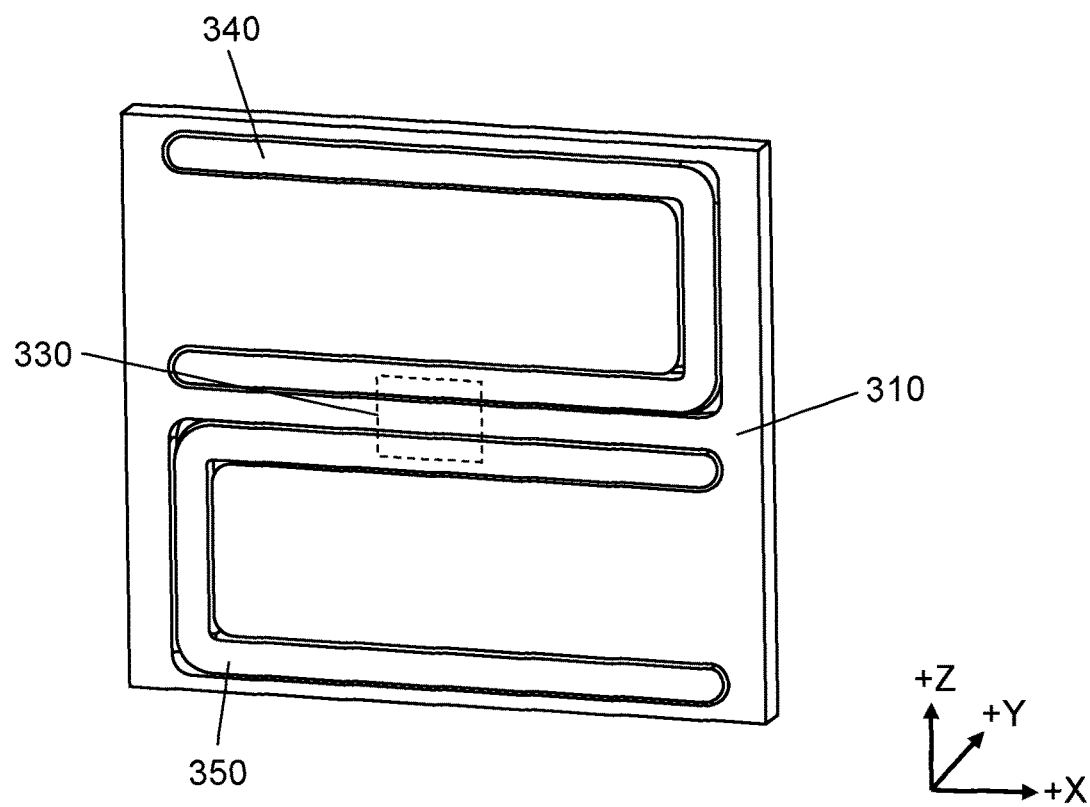
FIG. 5 is a perspective view showing the structure of a base of the heatsink in accordance with the first exemplary embodiment.
Figure 6:
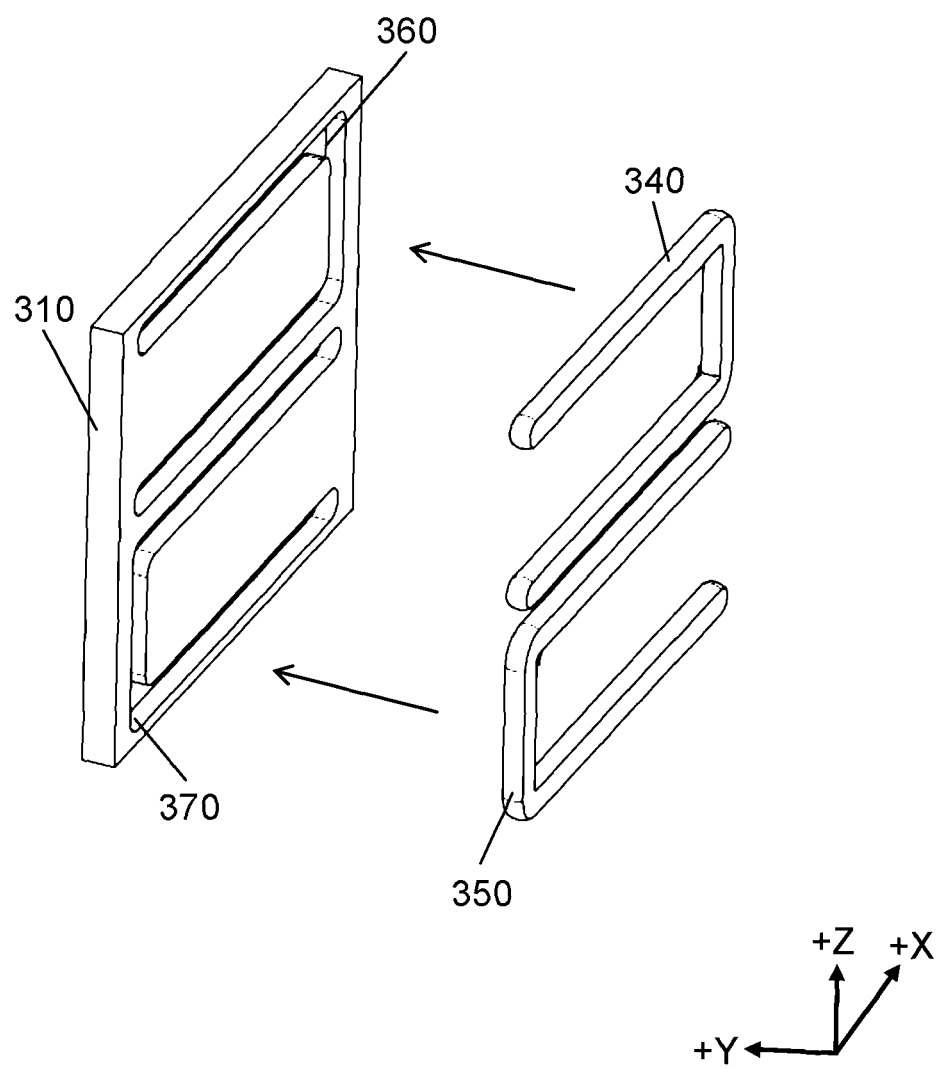
FIG. 6 is a perspective view showing a disassembled state of the base of the heatsink and the heat pipe in accordance with the first exemplary embodiment.

FIG. 3 is a perspective view of heatsink 300 of FIG. 1. FIG. 4 is a perspective view showing heatsink 300 that is disassembled to base 310 and fin section 320. FIG. 5 is an enlarged perspective view of base 310. FIG. 6 is a perspective view of base 310 where heat pipes 340, 350 are dismounted therefrom.

Heatsink 300 is formed of base 310, fin section 320, and a pair of heat pipes 340, 350. Fin section 320 has aluminum base plate 321 and a plurality of fins 322. Fins 322, which are aluminum thin plates, are disposed to base plate 321 at regular intervals. Fin section 320 may be a structure in which base plate 321 and fins 322 of aluminum are integrally molded by die casting.

Each of heat pipes 340, 350, as shown in FIG. 4 through FIG. 6, has the bottom and two extending arms that extend in the same direction (i.e., the X direction) from both ends of the bottom. The heat pipe has an opening on the side opposite to the bottom, i.e., it has an U shape. The two extending arms have substantially the same length and are longer than the bottom. The heat pipe has substantially a rectangular cross-section in a direction in which the heat pipe extends.

Base 310 has, as shown in FIG. 6, a pair of housing grooves 360, 370 for accommodating heat pipes 340, 350 therein on one side of the aluminum plate. The housing grooves 360, 370 are shaped so as to have the surface contact with accommodated heat pipes 340, 350, respectively. According to the embodiment, base 310 is made of aluminum with high thermal conductivity, but it is not limited to; base 310 may be made of copper, for example. When a solder alloy is applied into a space between housing grooves 360, 370 and heat pipes 340, 350, the thermal connection between them can be further enhanced.

Heat pipe 340 is fitted into housing groove 360 of base 310 and heat pipe 350 is fitted into housing groove 370 of base 310, so that heat pipes 340 and 350 are placed in an alternate orientation. That is, housing grooves 360 and 370 are formed so that heat pipes 340 and 350 have an alternate orientation. Specifically, as shown in FIG. 4 through FIG. 6, heat pipe 340 has its opening in the −X direction, whereas heat pipe 350 has its opening in +X direction. That is, their openings are disposed opposite to each other and thus the extending arms of them extend in the opposite direction. Besides, a pair of heat pipes 340, 350 is disposed in the Z direction in a way that the extending arms on the same side of each heat pipe are adjacently arranged.

As shown in FIG. 3, on one side of base 310, fin section 320 is disposed (as well as heat pipes 340 and 350), and on the other side of base 310, connecting member 330 is disposed. Connecting member 330, which is made of aluminum and integrally formed to base 310, is mechanically and thermally connected to DMD 236. Connecting member 330 is disposed to the position shown by the broken-line in FIG. 5 that straddles a part of the adjacently disposed heat pipes 340 and 350. In other words, connecting member 330 is disposed at a position that overlaps with the adjacent extending arms of heat pipes 340 and 350, seen from the normal direction to the surface on which heat pipes 340 and 350 are laid (i.e., seen from the Y direction in which connecting member 330 is disposed on base 310).

Base plate 321 is fixed to the groove-formed surface of base 310 through silicone grease so as to cover the heat pipes accommodated in the groove. The connection allows base plate 321 to thermally connect not only with the base but also with the heat pipes. In the structure shown in FIG. 4, fin section 320 is disposed to base 310 in a manner that a row of fins 322 is disposed in the same direction (i.e., in the X direction) in which the extending arms of heat pipes 340 and 350 extend, but it is not limited to. Fin section 320 may be disposed to base 310 in a manner that a row of fins 322 is disposed in the Z direction that is perpendicular to the direction in which the extending arms of heat pipes 340 and 350 extend.

[1-2. Workings of Heatsink]

Illumination light collected by lens 232 enters into TIR prism 235 and then irradiates DMD 236. When DMD 236 absorbs illumination light with no reflection, the light changes into heat and it transfers through connecting member 330 to an area close to the center of base 310 of heatsink 300.

The heat carried around the center of base 310 is diffused by heat pipes 340, 350 and is carried to base plate 321 of fin section 320. After carried to fins 322, the heat is dissipated by fan 390. Each of heat pipes 340 and 350 has operating fluid in its copper case. Receiving heat, the operating fluid carries the heat while circulating through the heat pipes. The positional relation between the direction in which gravitational force acts and the positions of the heat pipes at which heat is received and then dissipated produces difference in transfer amounts of heat. According to the structure of the embodiment, heat pipe 340, 350 are formed into a U-shape and they are disposed in an alternate orientation so as to suppress the difference in transfer amounts of heat due to the placement of the heatsink (heat pipes).

Heat pipes 340 and 350 are disposed on base 310 so as to have an intimate contact with the surface on which housing grooves 360 and 370 are formed. By virtue of the structure, the heat absorbed into heat pipes 340 and 350 diffuses all over base 310 and then effectively dissipated by fin section 320.

[1-3. Effect]

According to the embodiment, as described above, the heat generated in DMD that has received illumination light is effectively diffused by the heat pipes. Further, the diffused heat is carried to the fin section for heat dissipation. Besides, even when heatsink 300 is disposed so that gravitational force acts, for example, in the direction of the Z-axis, the structure maintains excellent cooling capacity and effective dissipation.

Second Exemplary Embodiment

Hereinafter, the structure of the second exemplary embodiment will be described with reference to FIG. 7 and FIG. 8. The base of the second exemplary embodiment has a structure different from that of the first exemplary embodiment, but as for other structures and workings of the components are the same, and therefore redundant description will be omitted. In the second embodiment, too, the description of FIG. 7 and FIG. 8 is based on the X-Y-Z orthogonal coordinate system shown in the drawings.

Figure 7:
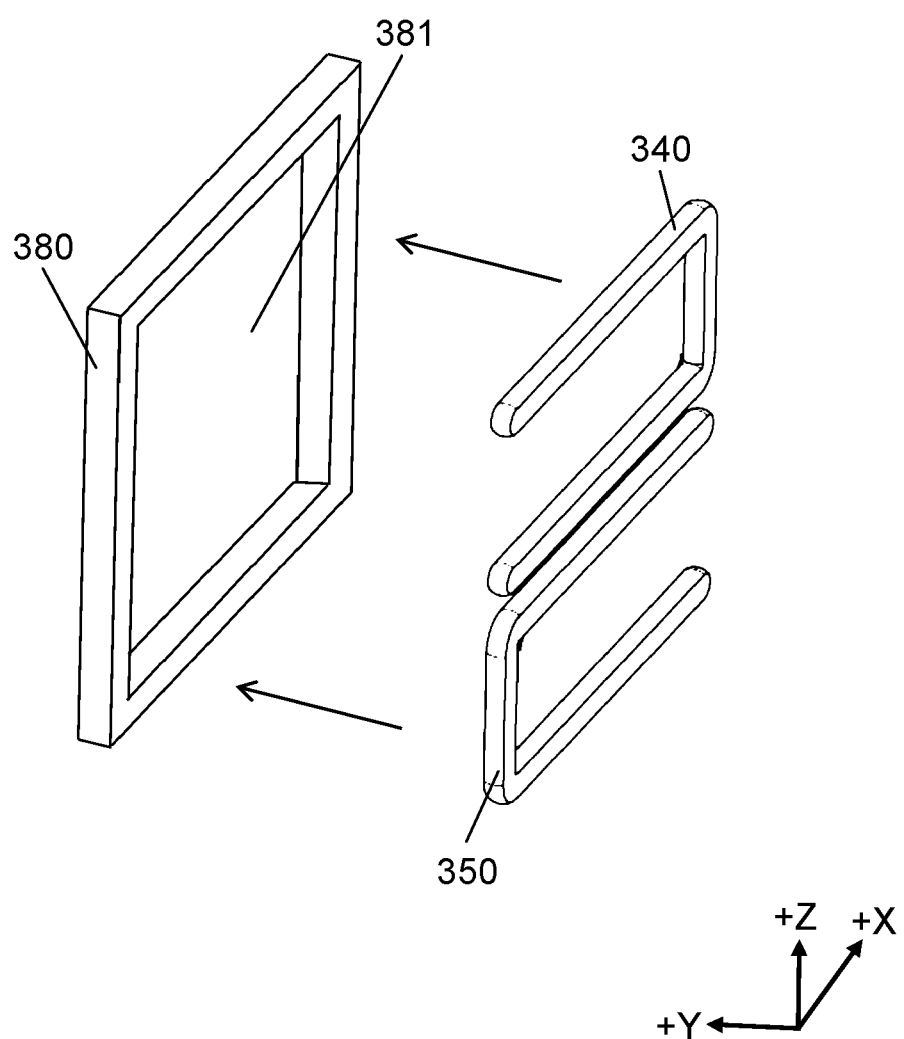
FIG. 7 is a perspective view showing a disassembled state of the base of the heatsink and the heat pipe in accordance with a second exemplary embodiment.
Figure 8:
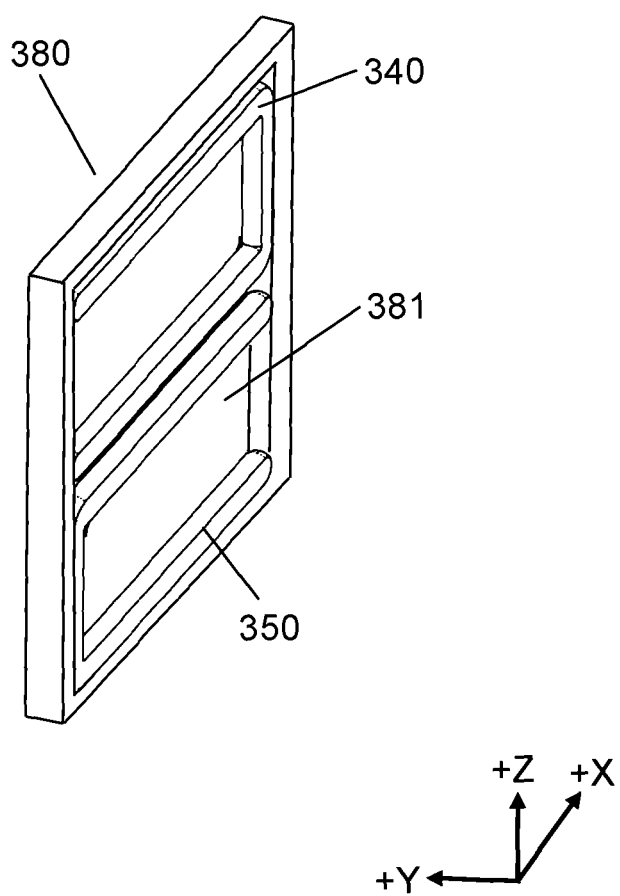
FIG. 8 is a perspective view showing the structure of the base of the heatsink in accordance with the second exemplary embodiment.

FIG. 7 is a perspective view of base 380, together with heat pipes 340 and 350, employed for the heatsink of the embodiment. FIG. 8 is a perspective view showing the state in which heat pipes 340 and 350 are disposed on the base.

Base 380 has a dish-like shape. In housing hollow 381 of base 380, a pair of heat pipes 340, 350 is closely disposed with an alternate orientation. On the side opposite to housing hollow 381 of base 380, although FIG. 7 and FIG. 8 do not show, connecting member 330 is disposed as is the case of heatsink 300 shown in FIG. 3. Base 380 and connecting member 330 are made of aluminum. After heat pipes 340 and 350 are disposed in housing hollow 381, melted solder alloy is poured into housing hollow 381 so that a space in it is filled up with the solder alloy and heat pipes 340 and 350 are embedded. After that, base plate 321 of fin section 320 is attached to base 380, by which housing hollow 381 is covered with base plate 321. The solder alloy used here is an example of thermally conductive material.

The structure above, as is in the case of the first exemplary embodiment, allows the heat generated in DMD 236 to be effectively dissipated through fin section 320.

Other Exemplary Embodiments

As described above, the first and the second exemplary embodiments have been described as an example of technique of the present disclosure. However, the technique of the present disclosure is not limited to the structure described above but is applicable to exemplary embodiments with various changes and modifications. Further, a combination of the components described in the first and the second exemplary embodiments may form another structure other than the example described above. Hereinafter, other exemplary embodiments will be described.

Figure 9:
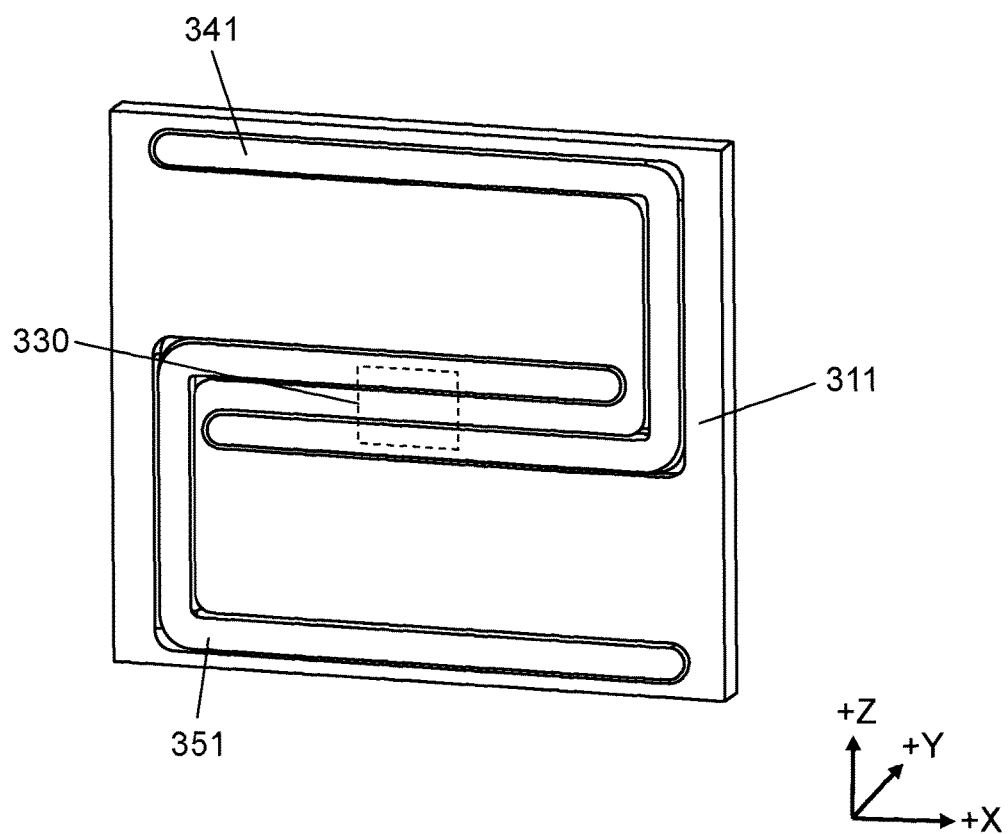
FIG. 9 is a perspective view showing the structure of the base of the heatsink in accordance with other exemplary embodiments.

The layout of a pair of the heat pipes is not limited to the examples shown in the first and the second exemplary embodiments. For instance, the heat pipes may be disposed on the base as shown in FIG. 9. That is, heat pipes 341 and 351 may be disposed on base 311 in such a way that one extending arm of heat pipe 341 (351) is inserted in the opening of heat pipe 351 (341). In heat pipes 341 and 351 in the structure above, the two arms extending from the bottom of each heat pipe may be different in length, as shown in FIG. 9, or may be the same with each other. Such a structure—where heat pipes 341 and 351 of an identical shape are disposed in an alternate orientation—also provides the heatsink with an excellent heat dissipation, regardless of its placement direction.

The DMD described in each exemplary embodiment is merely an example of heat-generating components, and therefore, the heat-generating component is not limited to a DMD. The heat-generating component may be the rear surface of the case of a semiconductor laser.

Further, it will be understood that the aforementioned embodiment is merely an example of the technique of the present disclosure. That is, the technique of the present disclosure is not limited to the structure described above, allowing modification, replacement, addition, and omission without departing from the spirit and scope of the claimed disclosure.

INDUSTRIAL APPLICABILITY

The present disclosure is applicable to projection image display devices, such as a projector.

What is claimed is:

1. A cooling device comprising:
   a thermally conductive base that is thermally connected to a heat-generating section;
   a heat pipe section embedded in the base; and
   a fin section that has a plurality of fins and is connected to the base in a way that the fin section covers the heat pipe section,
   wherein the heat pipe section is formed of a pair of U-shaped heat pipes, the heat pipes are disposed in a housing hollow formed on the base in a way that the heat pipes are disposed in an alternate orientation, and a space in the housing hollow is filled up with a thermally conductive material so that the heat pipes are embedded.

2. The cooling device of claim 1, further comprising:
a connecting member disposed to the base on a side opposite to a side on which the fin section is connected,
wherein, the connecting member is disposed at a position that overlaps with the pair of the heat pipes, seen from a direction in which the connecting member is disposed to the base.

3. The cooling device of claim 1, wherein the thermally conductive material is a solder alloy.

4. The cooling device of claim 1 further comprising:
a fan for sending air to the fin section.

5. A projection image display device comprising:
an illumination optical system including a light source;
a light modulation device that modulates, with use of an image signal, illumination light fed from the illumination optical system so as to output video light;
a projection optical system that projects the video light fed from the light modulation device as an enlarged image; and
the cooling device of claim 1 thermally connected to the light modulation device.

\* \* \* \* \*